United States Patent [19]
Bednarczyk et al.

[11] 3,906,915
[45] Sept. 23, 1975

[54] DUAL FUEL SYSTEM AND METHOD

[75] Inventors: Edward A. Bednarczyk, Royal Oak; Robert A. Spaulding, Huntington Woods; Clayton J. Trible, Troy, all of Mich.

[73] Assignee: General Motors Corporation, Detroit, Mich.

[22] Filed: Mar. 29, 1973

[21] Appl. No.: 346,077

[52] U.S. Cl. ............... 123/127; 123/179 G; 123/3; 123/136
[51] Int. Cl.² ......................................... F02M 25/08
[58] Field of Search ....... 123/179 G, 3, 180 A, 127, 123/119 E, 187.5 R, 136

[56] References Cited
UNITED STATES PATENTS

| | | | |
|---|---|---|---|
| 1,559,214 | 10/1925 | Woolson | 123/127 |
| 2,201,965 | 5/1940 | Cook | 123/3 |
| 3,635,200 | 1/1972 | Rundell et al. | 123/3 |
| 3,688,755 | 9/1972 | Grayson et al. | 123/3 |
| 3,788,283 | 1/1974 | Perry | 123/3 |
| 3,831,572 | 8/1974 | Csicsery | 123/3 X |
| 3,838,667 | 10/1974 | Csicsery | 123/3 |

*Primary Examiner*—Charles J. Myhre
*Assistant Examiner*—James D. Liles
*Attorney, Agent, or Firm*—Arthur N. Krein

[57] ABSTRACT

A fuel system and method to provide dual fuels for operation of an internal combustion engine in which regular gasoline fuel is conveyed through a column of adsorbent material wherein the low volatile constituents of the fuel are adsorbed while the high volatile constituents of the fuel flow therethrough to the engine for use in cold starting of the engine, regular fuel being used for the continued operation of the engine during which time desorption of the low volatile fuel components from the adsorbent material is being effected by flowing engine heated air through the adsorbent material and then into the induction system of the engine for consumption therein. Desorption of the low volatile components from the adsorbent material can also alternately be effected by either flowing exhaust gas or heated regular gasoline through the adsorbent material.

5 Claims, 2 Drawing Figures

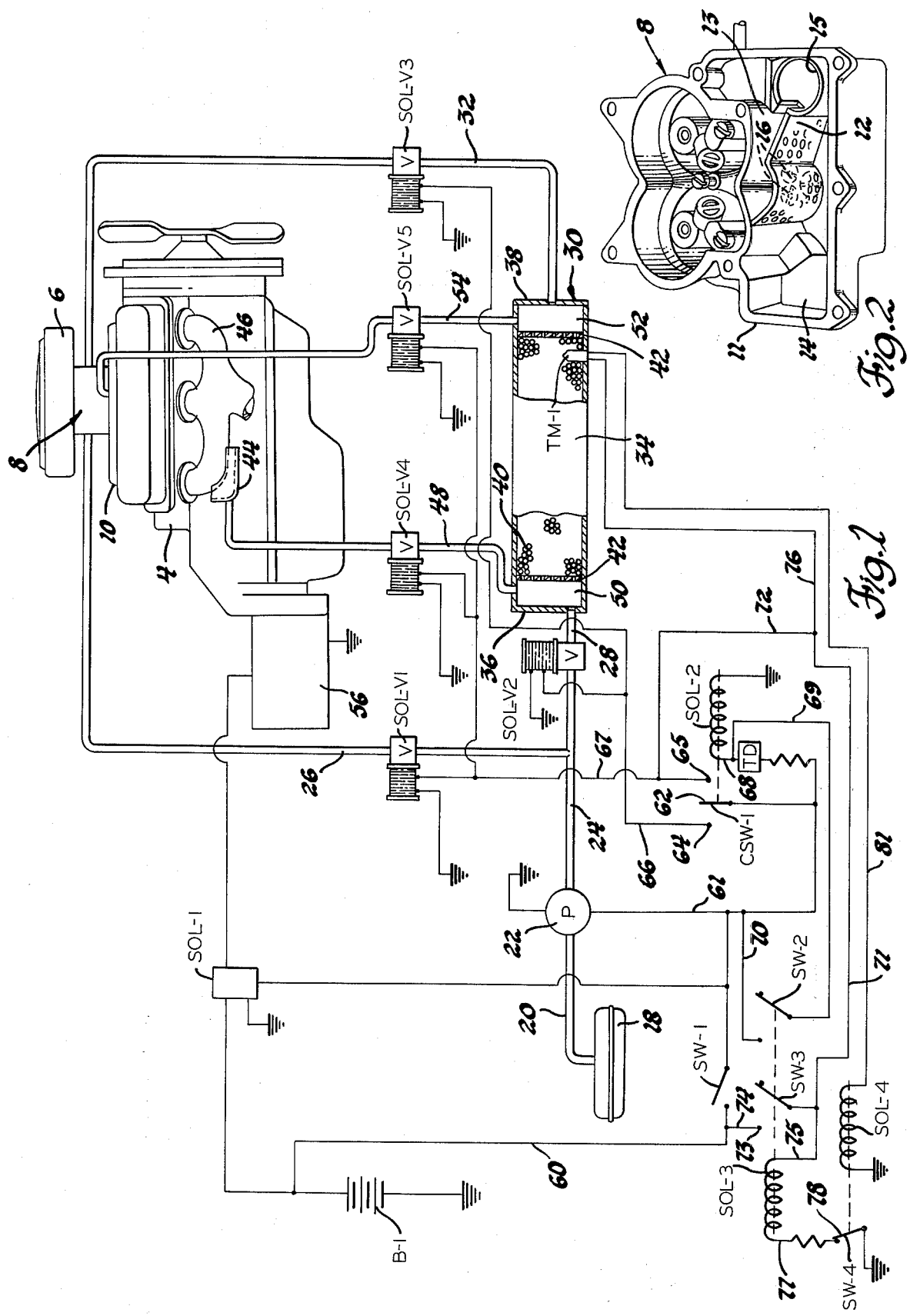

DUAL FUEL SYSTEM AND METHOD

This invention relates to a dual fuel system for an internal combustion engine and, more particularly, to a fuel fractionating apparatus and method for supplying high volatility fuel from a source of regular gasoline fuel to an engine for use during cold starting of the engine.

It is well known that the use of a high volatility fuel in an internal combustion engine during cold engine start-up will permit faster engine starting due to more rapid vaporization of such high volatility fuel in the induction system of the engine. It is also known that the use of such a high volatility fuel will effect a reduction in the emissions from the engine during cold starting of the engine as compared to the use of a regular fuel, such as gasoline, in the engine during this cold start-up.

However, it is also known that the continued use of such a high volatility fuel in the engine after engine warm-up is normally not practical due to economic considerations, the use of a regular gasoline in a conventional fuel system being preferred for continued operation of the engine. Because of this, various dual fuel systems have been proposed in the past wherein a high volatility fuel is used for engine start-up and a conventional fuel is used for continued engine operation, but such prior dual fuel systems have been somewhat complex and very costly.

It is therefore the primary object of this invention to provide a fuel system for an internal combustion engine in which regular fuel is flowed through a fractionator to provide a high volatility fuel for use during cold starting of the engine, the regular fuel then being used to effect engine operation after engine warm-up.

Another object of this invention is to provide a fuel fractionating apparatus and method for use in supplying high volatile fuel for use in an internal combustion engine, whereby the low volatility constituents of regular fuel from a fuel supply are separated in a fractionator by an adsorption process so that only high volatility fuel is delivered to the internal combustion engine during cold starting of the engine, desorption of the low volatility fuel and its subsequent use in the engine being effected after engine warm-up when the engine is operating on regular fuel.

These and other objects of the invention are attained by a fuel fractionating apparatus and method wherein regular gasoline fuel is flowed through a column of adsorbent material whereby the low volatility constituents of the fuel are adsorbed by this material while the high volatility constituents of the fuel pass through this column of adsorbent material to the induction system of the engine for consumption therein during cold starting of the engine and, after a predetermined time desorption of the low volatility constituents of the fuel from the column of adsorbent material is effected by conveying engine heated air through the column of adsorbent material to effect desorption by vaporizing the low volatility constituents and conveying this mixture of fuel vapors and air to the induction system of the engine for consumption therein.

For a better understanding of the invention, as well as other objects and further features thereof, reference is had to the following detailed description of the invention to be read in connection with the accompanying drawings, wherein:

FIG. 1 is a schematic view of an internal combustion engine and dual fuel system for the engine, the engine being supplied with dual fuels from a single source of fuel utilizing a fuel fractionating apparatus and method in accordance with the invention; and, FIG. 2 is a top perspective view of the fuel bowl of a conventional carburetor but with a perforated partition positioned within the fuel bowl.

Referring now to FIG. 1, reference character 4 designates the internal combustion engine of a vehicle with an air cleaner 6 and a carburetor 8 mounted thereon for supplying an air-fuel mixture to the induction system of the engine which includes the intake manifold 10. For a purpose which will become apparent, the carburetor 8 is of the type adapted to selectively supply either of two fuels to the engine and may be a double or compound carburetor having two separate fuel bowls of the type, for example, as disclosed in U.S. Pat. No. 1,268,680 issued June 4, 1918 to Dafford Dale Cates or, as shown in FIG. 2, the carburetor 8 may be a conventional type carburetor having the fuel bowl 11 thereof partitioned by a perforated partition 12. As best seen in FIG. 2, the perforated partition 12 is positioned within the fuel bowl to separate the fuel bowl into two bowl chambers, a low volume chamber 13 extending from the fuel inlet portion 15 of the fuel bowl to the outlet or main metering jets 16 area of the fuel bowl and, a larger volume chamber 14 which would normally contain only regular fuel therein, these two chambers being in fluid flow relationship to each other through the perforations in the perforated partition 12.

Now, in accordance with the invention, dual fuels are supplied to the carburetor 8 for use in the engine 4 from a single source of fuel, such as regular gasoline fuel contained in a fuel reservoir or tank 18. As described in greater detail hereinafter, regular gasoline fuel from the fuel tank 18 is delivered to the fuel bowl 11 of the carburetor and high volatile fuel is also supplied to the fuel bowl 11 of the carburetor from a fractionator 30 which is used for the onboard fractionation of the regular fuel into its high and low volatility constituents.

As shown, regular gasoline fuel is supplied to the fuel bowl 11 of the carburetor from the fuel tank 18 via a conduit 20 and a motor driven fuel pump 22 through a conduit 24 and a branch conduit 26, the latter conduit being connected through a T-connection, not shown, to the fuel bowl 11 and having flow therethrough controlled by a solenoid control valve SOL-V1.

Regular fuel flowing in conduit 24 is also supplied through a solenoid control valve SOL-V2 and a conduit 28 to one end of the fractionator 30 wherein the low volatile constituents of the regular fuel are retained, in a manner to be described, within the fractionator, while the high volatile constituents of the fuel are permitted to flow through the fractionator for delivery via conduit 32, as controlled by a solenoid control valve SOL-V3 to the fuel bowl 11 of the carburetor 8, the conduit 32 being connected to the opposite side of the previously described T-connection from conduit 26.

Fractionator 30, which may be of any desired size and configuration as required for a particular engine and vehicle arrangement, includes in the embodiment disclosed a cylindrical canister 34 partly closed at opposite ends by end walls 36 and 38, the canister containing a column or bed of adsorbent material 40. Suitable means, such as screens 42, are secured within the canister to retain the adsorbent material therein and to space this column or bed of adsorbent material from the opposite end walls of the canister while permitting liquid fuel and aeriform fluid to pass therethrough.

The adsorbent material 40 may be any suitable material which will preferentially adsorb or absorb the low volatile constituents of the gasoline while permitting the high volatile constituents of the fuel to flow therethrough. A very suitable adsorbent material for this purpose is a commercially produced molecular sieve material identified as MOLSIV-CC4902-14×30 mesh, manufactured by the Union Carbide Corporation, Materials System Division, Terrytown, N.Y.

The dimensions of the canister 35 and the quantity of adsorbent material 40 therein are predetermined so as to permit the fractionator to produce the desired quantity of high volatile fuel to permit cold starting of the engine and operation of the engine until a suitable engine operation temperature is reached. The duration of operation of the engine using high volatile fuel can be determined by a suitable temperature sensor or, as shown, by a predetermined fixed operating time cycle for a given engine, to be described.

Since the high volatile fuel used for cold starting and initial operation of the engine is produced onboard the vehicle by passing a regular gasoline fuel through a column of adsorbent material which will preferentially adsorb the low volatile constituents thereof, it will be necessary after each use of the fractionator 30 to produce the high volatile fuel, to reactivate or regenerate the adsorbent material.

In the embodiment disclosed, this is done by flowing heated air through the bed of adsorbent material to desorb the low volatile fuel therefrom with the thus desorbed fuel vapors and air being conveyed from the fractionator 30 to the induction system of the engine for consumption therein during normal operation of the engine. As shown, hot air is drawn through an air inlet shoe 44 positioned in spaced thermal relation to the exhaust manifold 46 of the engine 4 and this air is conveyed through a solenoid control valve SOL-V4 controlled conduit 48 into one end of the fractionator 30, into the chamber 50 formed between the end wall 36 and the left-hand screen 42 as seen in FIG. 1 with this heated air then flowing through the adsorbent material 40. The hot air flowing through the adsorbent material vaporizes the low volatile fuel from the adsorbent material and then the mixture of air and fuel vapors flow into the chamber 52 within the canister between the end wall 38 and the screen 42 positioned at the right end of the canister from where this mixture of air and fuel vapors flow through a conduit 54 controlled by a solenoid control valve SOL-V5 into the intake manifold 10 of the engine 4, manifold vacuum drawing the air and fuel vapor mixture into the engine wherein it is consumed. This regeneration cycle may be controlled by a suitable timer or as shown, the temperature of the adsorbent material within the canister, as measured by a thermocouple switch TM-1, which is normally open, is used as an indication that a regeneration cycle has been completed in a manner to be described.

The solenoid control valves SOL-V1, SOL-V2, SOL-V3, SOL-V4 and SOL-V5, which are normally closed, are energized through a control circuit, to be described, from a suitable source of electrical power, such as the engine battery B-1, through an ignition switch SW-1. As is conventional, the ignition switch SW-1 is also used in the electrical circuit for the engine 4 and is used to control the operation of the engine starter 56 through the starter solenoid SOL-1.

In the embodiment of the control circuit shown, the battery B-1 is connected by a conductor 60, the ignition switch SW-1 and conductor 61 to the pump 22 and to a movable contact arm 62 of a two-position control switch CSW-1, the arm 62 being suitably connected to the armature 63 of a solenoid SOL-2, for movement thereby to either make electrical contact with a terminal 64 or terminal 65 of the control switch CSW-1, the movable contact arm 62 normally making contact with terminal 64 when solenoid SOL-2 is de-energized. Terminal 64 is connected by a conductor 66 with solenoid control valves SOL-V2 and SOL-V3 while terminal 65 is connected by a conductor 67 to the solenoid control valves SOL-V4, SOL-V5 and SOL-V1.

The solenoid SOL-2 is connected by a conductor 68 through a time delay circuit TD to conductor 61 whereby the solenoid SOL-2 can normally be energized after a suitable time delay, for example, 140 seconds after the closure of ignition switch SW-1. In addition, the solenoid SOL-2 is also connectable by a conductor 69 through the normally open contact of a normally closed switch SW-2 and a conductor 70 which is directly connected to the conductor 61, this circuit, when completed in a manner and for a purpose to be described, forming a bypass circuit around the time delay circuit TD.

The switch SW-2 is movable by the armature of a solenoid SOL-3 used to control the operation of a holding circuit which includes a normally closed switch SW-3 also connected to the armature of the solenoid SOL-3. Switch SW-3 is connected by a conductor 71 and a conductor 72 to the conductor 67, with the normally open contact 73 of this switch being connected by a conductor 74 to the conductor 60 at a position between the ignition switch SW-1 and battery B-1.

One terminal of the solenoid SOL-3 is connected by a conductor 75 to the conductors 71 and 72 and conductor 67 to the terminal 65, the other terminal of this solenoid being connected by a conductor 77 to the normally closed contact 78 of a switch SW-4. Switch SW-4 is actuated by the armature of a solenoid SOL-4, this solenoid SOL-4 being connected by conductor 81 to the other terminal, not shown, of the thermostat switch TM-1, the other terminal of the switch TM-1 being connected by conductor 76 to the conductors 72 and 67 to terminal 65 of the control switch CSW-1, this circuit forming a reset circuit.

As previously mentioned, all of the solenoid control valves are closed until the ignition switch SW-1 is closed. Assuming now that a regeneration cycle of the fractionator 30 has been previously completed, when the ignition switch SW-1 is closed to initiate engine operation, the electric fuel pump 22 is energized as are the solenoid control valves SOL-V2 and SOL-V3, the movable contact arm 62 of control switch CSW-1 normally making electrical contact with the terminal 64 when solenoid SOL-2 is not energized. With the solenoid valves SOL-V2 and SOL-V3 now energized, regular gasoline fuel will be pumped by the fuel pump 22 to the fractionator 30 with the low volatile constituents of this fuel thus pumped into the fractionator being retained therein within the bed of adsorbent material 40, while the high volatile fuel components will flow through the fractionator and out through the conduit 32 and the now open solenoid control valve SOL-V3 to the fuel bowl 11.

As can be seen in FIG. 2, the fuel bowl would contain regular fuel on both sides of the perforated partition. Upon turning over the engine during starting, fuel from the low volume chamber 13 would be used first but would then be immediately replenished by the high volatile fuel flowing from the fractionator 30, this high volatile fuel mixing with the small quantity of regular fuel which may still be in the low volume chamber 13 to provide initially a fuel mixture to the engine which has a higher percentage of a high volatile fuel constituents therein than regular fuel. After a very short period of time, all of the fuel in the low volume chamber 13 will be high volatile fuel. While high volatile fuel is being pumped into the low volume chamber 13, there is little opportunity for mixing of the raw fuel in chamber 14 with the high volatile fuel in chamber 13 because of the presence of the perforated partition between these two bodies of liquid even though limited liquid flow can occur between these chambers.

At the end of the time interval established by the time delay circuit TD, the solenoid SOL-2 will be energized to move the contact arm 62 of the control switch CSW-1 in a clockwise direction as seen in FIG. 1, breaking its contact with terminal 64 and making contact with terminal 65, thereby de-energizing solenoid control valves SOL-V2 and SOL-V3 while energizing solenoid control valves SOL-V1, SOL-V4 and SOL-V5. As solenoid valves SOL-V2 and SOL-V3 are de-energized, the flow of regular fuel to the fractionator 30 is blocked as is the flow of fuel or fuel vapors from the fractionator through the conduit 32. As solenoid control valve SOL-V1 is energized, the pump 22 can then supply regular fuel through the conduit 26 to the fuel bowl 11 of the carburetor for continued operation of the engine using regular fuel.

When the solenoid control valves SOL-V4 and SOL-V5 are energized to open these valves, heated air from the air inlet shoe 44 can then flow through the conduit 48 to the fractionator 30, this heated air then desorbing fuel vapors from the adsorbent material 40, with the air and desorbed fuel vapors then flowing from the fractionator 30 through the conduit 54 to the intake manifold 10 of the engine for consumption within the engine.

When the electrical circuit is completed to terminal 65, as described above, electrical power is also applied through conductors 72, 71 and 75 to energize the solenoid SOL-3, this solenoid also being connected by the conductor 77 and the normally closed contact 78 of switch SW-4 to ground. As the solenoid SOL-3 is energized, the switches SW-2 and SW-3 are moved to make contact with their respective normally open terminals, the switch SW-3 then completing a holding circuit through the conductor 74 to maintain the solenoid SOL-3 energized even if the ignition switch SW-1 is opened. At the same time, the closure of switch SW-2 to its normally open contact completes a bypass circuit through the conductors 69 and 70 around the time delay circuit TD.

As previously described, the regenerator cycle for the adsorbent material 40 of the fractionator 30 can be time controlled or, as shown, can be controlled as by having the adsorbent material 40 reach a predetermined temperature, as desired, which is measured by the thermostat switch TM-1, the contacts of which will close when this temperature has been reached to signal completion of the regeneration cycle. Otherwise, if a regeneration cycle has not been completed, in the embodiment disclosed, the electrical circuit described is such as to prevent regular fuel from being supplied to the fractionator until such a regeneration cycle has been completed.

Now, assume that the engine 4 has not been operated for a sufficient period of time to effect completion of the regeneration cycle for the fractionator 30 before the engine is shut off by opening of the ignition switch SW-1. When the ignition switch SW-1 is opened, the solenoid control valves SOL-V1, SOL-V4 and SOL-V5 are de-energized as is the fuel pump 22. However, the solenoid SOL-3 remains energized through the holding circuit previously described to hold the switch SW-2 in contact with its normally open contact. Thus, when the ignition switch SW-1 is again closed to initiate operation of the engine, the solenoid SOL-2 is immediately energized through this bypass circuit around the time delay circuit TD, so that the movable contact arm 62 of the control switch CSW-1 is immediately moved out of contact with terminal 64 and into contact with terminal 65 to effect energization of the solenoid control valve SOL-V1 to permit the fuel pump to supply regular fuel through the conduit 26 to the fuel bowl 11 of the carburetor, the engine thus being started using regular fuel. Regular fuel is not supplied to the fractionator 30 during this engine starting cycle. At the same time, the solenoid control valves SOL-V4 and SOL-V5 are energized to effect continued regeneration of the adsorbent material in the fractionator by hot air flowing through the conduit 48 into the fractionator with air and fuel vapors flowing from the fractionator through the conduit 54 to the intake manifold of the engine.

Now, assuming that the engine is operated for a sufficient period of time to effect complete regeneration of the adsorbent material 40 in the fractionator 30, as indicated by an increase in the temperature of the adsorbent material to a predetermined temperature as sensed by the thermostat switch TM-1. When this occurs, the contacts of the thermostat switch TM-1 will close to form a completed circuit through the conductors 67, 72, 76, the contacts of the thermostat switch TM-1 and conductor 81 to energize the solenoid SOL-4 to effect opening of the switch SW-4 thereby de-energizing solenoid SOL-3 to permit the switches SW-2 and SW-3 to move back to their respective positions as shown in FIG. 1, thereby breaking the previously described holding circuit and also the bypass circuit around the time delay circuit TD.

Now, if the engine is again shut off and then later restarted, the control circuit is now reset so that the solenoid control valves SOL-V2 and SOL-V3 will initially be energized as previously described to permit the fuel flow through the fractionator 30 to provide high volatile fuel for use in engine starting, in the manner previously described.

It will be apparent to those skilled in the art that various modifications can be made to the system disclosed to provide dual fuels for use in operating the engine 4 by the use of an onboard fuel fractionating apparatus of the type disclosed. For example, instead of using hot air, heated by the engine exhaust manifold as described to effect regeneration of the adsorbent material within the fractionator, it would be apparent that an exhaust gas recirculation system could be used to effect this desorption or alternatively, heated regular gasoline fuel could be flowed through this adsorbent material to effect desorption of the previously adsorbed low volatility constituents of the fuel remaining in the adsorbent material after a fuel fractionating cycle.

What is claimed is:

1. A fuel system for an internal combustion engine having a fuel induction system including a dual fuel carburetor and an electrical ignition system including a battery and an ignition switch, said fuel system including a reservoir for regular fuel, a fuel pump having an inlet connected to said reservoir and a pump outlet, conduit means connected to said pump outlet and includng a first conduit means, having a first valve therein, connected to the dual fuel carburetor for supplying regular fuel to the dual fuel carburetor and a second conduit means connected to the dual fuel carburetor, said second conduit means including a fuel fractionator containing a bed of adsorbent material adapted to retain the low volatile components of fuel flowing therein while permitting high volatile components of the fuel to flow therethrough and valve means controlling the flow of fuel into and out of said fuel fractionator, valve controlled conduit means connected at one end to a source of desorbing fluid, intermediate its end to said fuel fractionator and at its opposite end to the fuel induction system to effect desorption of low volatile components of fuel from said fuel fractionator by the flow of desorbing fluid therethrough and to convey the desorbed fuel and desorbing fluid from said fuel fractionator to the fuel induction system of the engine for consumption therein and, control means connected to the ignition system and including switch means operatively connectable to said valve means and to said first valve and said valve controlled conduit means, said control means further including time delay means operatively connected to said switch means to normally sequentially position said switch means for actuating said valve means upon engine start-up and then to actuate said first valve and said valve controlled conduit means while de-actuating said valve means to permit regular fuel to be supplied to the dual fuel carburetor and to permit desorbed fuel from said fuel fractionator to be conveyed to the engine for consumption therein, said control means further including a holding circuit control means operatively connected to said switch means and to the ignition system between the battery and the ignition switch to normally maintain an energized circuit to said switch means after initial actuation by said time delay means to effect connection of the switch means with said first valve and said valve controlled conduit means and, regeneration cycle signal control means connected to said holding circuit control means to de-actuate said holding circuit control means after a regeneration cycle has been completed as indicated by a signal produced by said regenerating cycle signal control means.

2. A fuel system according to claim 1 wherein said regeneration cycle signal control means includes a thermocouple switch positioned in thermal relationship to said adsorbent material in said fuel fractionator.

3. A fuel system for an internal combustion engine having a fuel induction system including a dual fuel carburetor and an ignition system including a battery and an ignition switch, said fuel system including a reservoir for regular fuel, a fuel pump having an inlet connected to said reservoir and a pump outlet, conduit means connected to said pump outlet and including a first conduit means, having a first valve therein, connected to the dual fuel carburetor for supplying regular fuel to the dual fuel carburetor and, a second conduit means connected to the dual fuel carburetor, said secnd conduit means including a fuel fractionator containing a bed of adsorbent material adapted to retain the low volatile components of fuel flowing therethrough and valve means controlling the flow of fuel into and out of said liquid fuel fractionator, valve controlled conduit means connected at one end to a source of heated aeriform fluid, intermediate its ends to said fuel fractionator and at its opposite end to the fuel induction system to effect desorption of low volatile fuel from said fuel fractionator and to convey the desorbed fuel and heated aeriform fluid from said fuel fractionator to the fuel induction system of the engine for consumption therein and, control means connected to the ignition system and including switch means normally sequentially operatively connected to said valve means and then to said first valve and said valve controlled conduit means whereby said valve means is actuated upon engine start-up to permit regular fuel to flow to said fuel fractionator and to permit the high volatile fuel therefrom to be conveyed to the dual fuel carburetor for use during engine start-up and then, said first valve and said valve controlled conduit means are actuated while said valve means are de-actuated whereby regular fuel will be supplied to the dual fuel carburetor for continued operation of the engine and desorbed fuel from said fuel fractionator will be conveyed to the engine for consumption therein and, wherein said switch means includes a switch and a switch actuating means and wherein said control means further includes a time delay circuit connected to said switch actuating means for energizing said switch actuating means a predetermined time interval after engine start-up, a bypass circuit around said time delay circuit and connected to said switch actuating means for energizing said switch actuating means, a holding circuit connected to the ignition system between the battery and the ignition switch and to the bypass circuit and, a regeneration cycle signal means, adapted to generate a signal upon completion of a desorption cycle in said fuel fractionator, connected to said holding circuit to de-energize said holding circuit upon generation of said signal.

4. A fuel system according to claim 3 wherein said regeneration cycle signal control means includes a thermocouple switch positioned in thermal relationship to said adsorbent material in said fuel fractionator.

5. A fuel system for an internal combustion engine having an exhaust manifold and having a fuel induction system including a carburetor having a partitioned float bowl, and an ignition system including a battery and an ignition switch, said fuel system including a fuel reservoir for regular gasoline fuel, a fuel pump having an inlet connected to said reservoir and an outlet, conduit means connected to said outlet and including a first conduit, having a first valve therein, connected to the partitioned float bowl for supplying regular gasoline fuel to the float bowl and a second conduit having a second valve therein, a fuel fractionator containing a bed of adsorbent material adapted to retain the low volatile components of fuel supplied to said fuel fractionator while permitting the high volatile components of the fuel to flow therethrough, said fuel fractionator having a first inlet, a second inlet, a first outlet and a second outlet, said second conduit being connected to said first inlet of said fuel fractionator, a third conduit having a third valve therein connected to said first outlet and to said partitioned float bowl, a fourth conduit having a fourth valve therein connected at one end to said second inlet and having its opposite end positioned adjacent to the exhaust manifold to receive air flowing across the exhaust manifold, a fifth conduit having a fifth valve therein connected at one end to said second outlet and at its other end to the fuel induction system of the engine and, control means including time delay controlled switch means operatively connected to the ignition system and operatively connectable to said second valve and said third valve and, to said first valve, said fourth valve and said fifth valve to normally sequentially first actuate said second valve and said third valve upon engine start-up and, after a predetermined period of time actuating said first valve, said fourth valve and said fifth valve, while de-actuating said second valve and said third valve during continued operation of the engine.

* * * * *